United States Patent [19]

Chin et al.

[11] 4,414,010
[45] Nov. 8, 1983

[54] APPARATUS FOR ATTENUATING MINERAL FIBERS

[75] Inventors: John F. Chin, Toledo; Joseph A. Rhodes, Sylvania, both of Ohio; James E. Kusterer, Sedalia, Colo.

[73] Assignee: Manville Service Corporation, Denver, Colo.

[21] Appl. No.: 390,567

[22] Filed: Jun. 21, 1982

[51] Int. Cl.³ .................................. C03B 37/065
[52] U.S. Cl. ................................ 65/16; 65/5; 431/158
[58] Field of Search ..................... 65/16; 431/158

[56] References Cited

U.S. PATENT DOCUMENTS

| | | |
|---|---|---|
| 2,455,908 | 12/1948 | Slayter . |
| 2,578,101 | 12/1951 | Stalego . |
| 3,015,127 | 1/1962 | Stalego . |
| 3,212,557 | 10/1965 | Perry . |
| 3,442,633 | 5/1969 | Perry ........................... 65/16 X |
| 3,547,568 | 12/1970 | Shisler ......................... 431/158 |
| 3,787,195 | 1/1974 | Kircheim ...................... 65/16 X |
| 3,885,940 | 5/1975 | Levecque et al. .................. 65/5 |
| 4,123,243 | 10/1978 | Levecque et al. ................. 65/16 |
| 4,145,203 | 3/1979 | Levecque et al. ................. 65/16 |
| 4,199,338 | 4/1980 | Levecque et al. ................. 65/16 |

*Primary Examiner*—Robert L. Lindsay, Jr.
*Attorney, Agent, or Firm*—Ronald M. Halvorsen; John D. Lister; Richard K. Thomson

[57] ABSTRACT

An attenuating burner apparatus which requires less energy to soften the glass filaments. A shroud is provided for the attenuation zone which retains heat and limits the amount of dilution air that is entrained by the attenuation blast. The forward portion of the shroud is pivoted to permit adjustment to provide general alignment with the attenuation blast. A closure is provided for at least one of the openings through which dilution air is inspirated and a preheater uses waste heat to increase the temperature of the dilution air inspirated through another of the openings.

10 Claims, 5 Drawing Figures

APPARATUS FOR ATTENUATING MINERAL FIBERS

BACKGROUND AND SUMMARY OF THE INVENTION

In one method of forming mineral fibers, such as glass, for example, batch materials or preformed marbles are melted and continuous filaments of molten material are pulled from a bushing. These filaments, known as primaries, are then reheated by an attenuating burner to a temperature in excess of the softening temperature of the glass in order that the filaments may be attenuated. These attenuating burners have extremely high gas flow rates in order to stretch the filaments while they are heated so as to reduce their diameter. As the attenuated filaments cool below the melting temperature of the glass, these filaments are broken by the force of the attenuating blast into fibers within a predetermined range of lengths, this range being a function of the operational parameters and the configuration of the attenuation zone.

As energy costs continue to spiral upward, efforts are being expanded to find ways to reduce the amount of gas used in fiber manufacturing. Of the total energy expended in fiberizing glass, or the like, from raw materials, approximately ⅔ is used in attenuating the fibers. Even a small percentage reduction in the amount of gas used in fiber attenuation can result in significant cost avoidance. The high velocity attenuation blast entrains cooler air from its surroundings. This low energy, low velocity air is mixed with the attenuation stream thereby diluting it and reducing both its temperature and velocity. The capability of the attenuating apparatus to reduce fiber diameter (i.e., to improve the insulating capabilities of the material) is hampered by this unrestricted stream dilution. To offset the disadvantages of dilution, more gas must be burned to produce higher temperatures.

The present invention overcomes the problems of unrestricted dilution by providing a shroud around the attenuation region. This attenuation shroud limits the entrainment of dilution air by restricting the access of the surroundings to the region. The shroud also confines the heat thereby increasing the temperature in the attenuation zone. Several openings are provided in the shroud to permit a restricted amount of dilution air to be beneficially entrained by the attenuation stream. The dilution air from at least one of the openings is provided with a preheater which uses waste heat rising from the attenuating burner to heat the air. This preheated dilution air, preferably enters the shroud from the rear where it performs two useful functions. Firstly, the preheated dilution air strikes the primary filaments and preheats them prior to their exposure to the main attenuating blast. Secondly, this inspirated flow of air provides a downward and forward force which assists in maintaining the primaries in contact with a threaded spacer bar that reduces the frequency with which the filaments become entangled with each other.

The attenuating burner with which this shroud is used has a mounting which permits a degree of play in its mounting. That is, while the position of the front end of the burner is generally fixed, the position of the rear end of the burner may be located in a number of horizontal planes to accommodate attachment to upstream elements, resulting in a variability in the direction of flow of the attenuation blast. A completely stationary shroud could, therefore, find itself in the path of the attenuation blast resulting in fiber buildup, flow disruption and, possibly, damage to the shroud itself.

The shroud of the present invention avoids these problems by being formed of a first stationary portion mounted adjacent the burner and a second downstream portion pivotally mounted to the first portion. In this manner, the forward end of the shroud may be adjusted upwardly or downwardly to more generally be aligned with the flow direction of the blast.

The position of the stream of gases can also be adjusted within the shroud by adjusting the amount of air inspirated above and below the centerline of the blast or stream. A first opening is provided below the centerline of the stream and is located between the burner and the shroud. The size of this first opening is varied as the position of the pivotal shroud portion is adjusted. A second opening is positioned above the centerline of the stream and asymmetrically with respect to the first opening. This second opening is provided with an adjustable closure of damper so that the amount of air inspirated through this opening can be adjusted, preferably, to balance the amount of air inspirated through the first opening, to properly position the attenuation stream. The inspirated air stream from this second opening impinges upon the main attenuation stream at a significant angle and in sufficient flow quantities to create turbulence in the combined stream. This turbulence causes the primary filaments to adopt a serpentine path within the attenuation zone which increases the length of time each primary is exposed to the heat of the attenuation zone and thereby improves fiber attenuation (i.e., reduces fiber diameter).

Other features, advantages and characteristics will become apparent after a reading of the following specification.

BRIEF DESCRIPTION OF THE DRAWINGS

FIG. 4 is a bottom view of a portion of the attenuation shroud of the present invention; and FIG. 5 is a schematic side view of the attenuation shroud of the present invention.

DETAILED DESCRIPTION OF THE PREFERRED EMBODIMENTS

Figure 1:
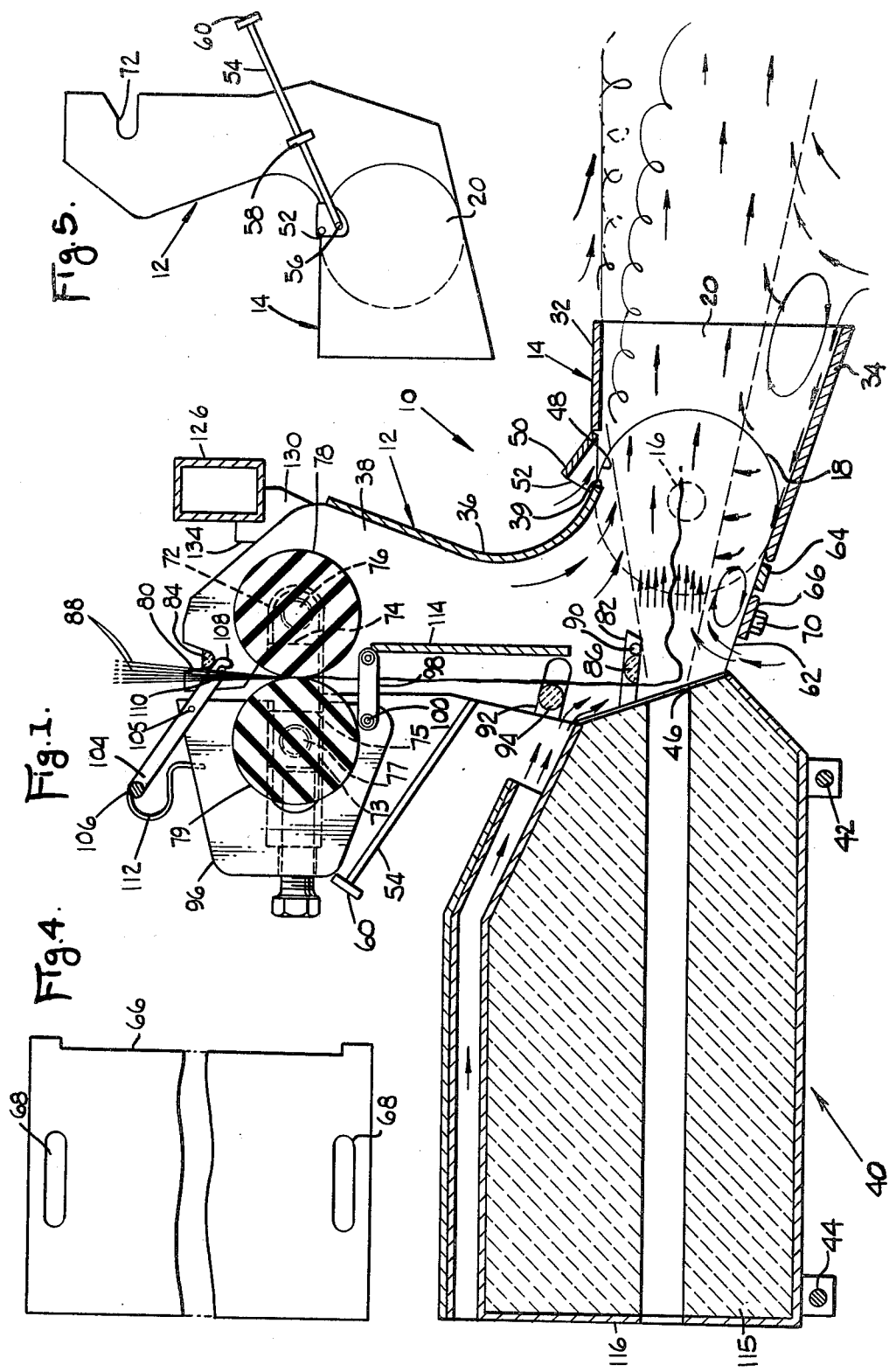
FIG. 1 is a cross sectional side view showing the attenuation shroud mounted adjacent the attenuation burner of the present invention.

An attenuation shroud is shown in the drawings generally at 10. As shown in FIG. 1, attenuation shroud 10 consists of a first or rear section 12, stationarily mounted adjacent the discharge end of an attenuating burner 40 and a second or front section 14 pivotally attached to the first section 12. Attenuating burner 40 has a first mounting bar 42 and a second mounting bar 44. Mounting bar 42 is generally fixedly positioned in a mounting bracket (not shown). The second bar 44, on the other hand, can be positioned at any of a number of horizontal positions to facilitate connection to gas lines or similar upstream elements.

Figure 2:
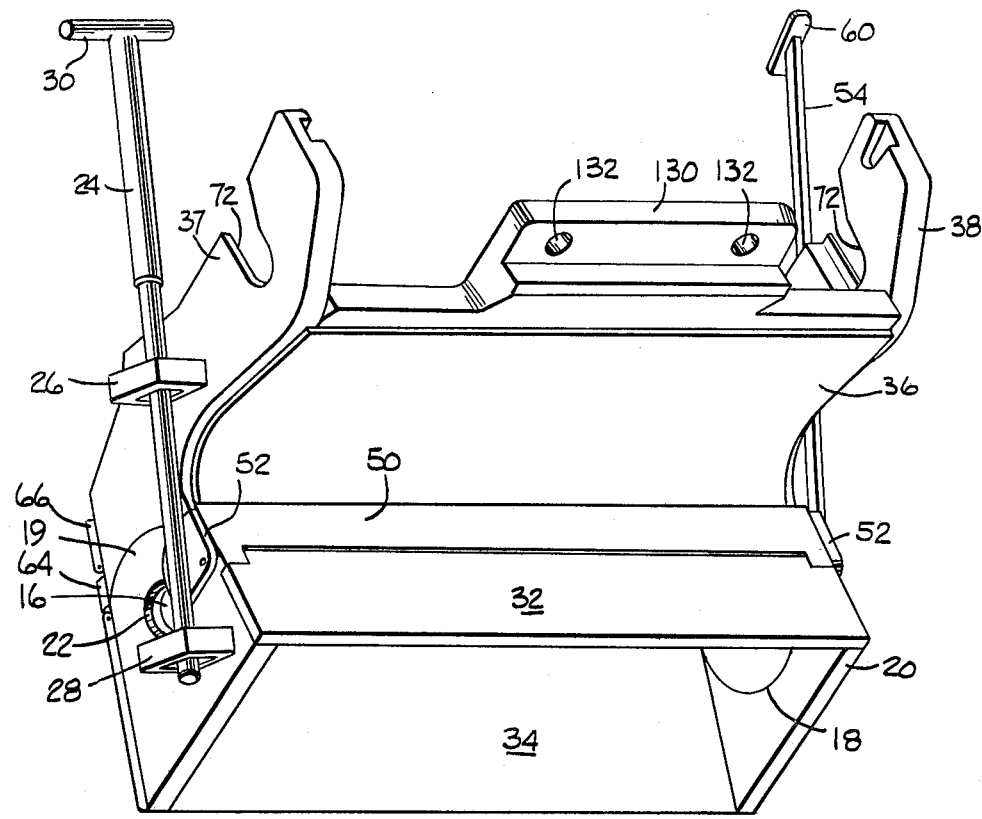
FIG. 2 is a perspective view of the attenuation shroud used in the present invention.
Figure 3:
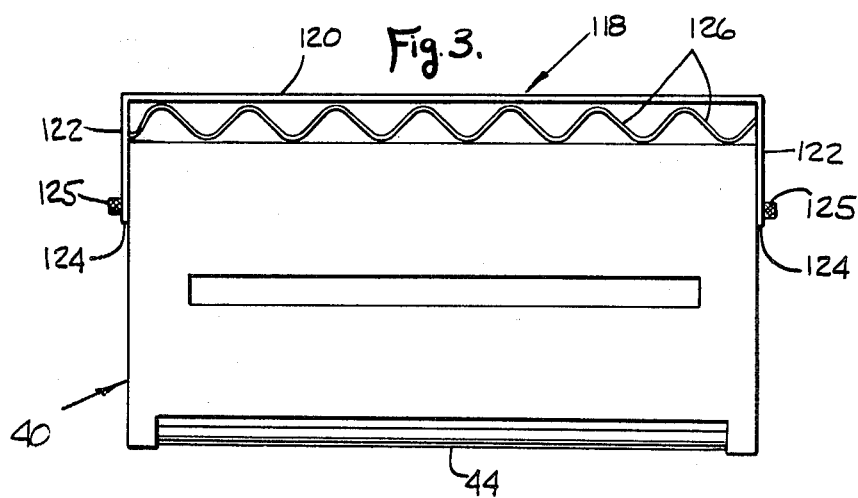
FIG. 3 is an end view of the attenuation burner with the inspirated air preheater mounted thereon.

The high pressure, high velocity attenuating stream exiting from burner outlet orifice 46 will be given any of a number of possible directions, as a result. A stationarily mounted attenuation shroud would most likely find some portion of its exit end in line with the attenuating stream. Such portion would interfere with normal stream and fiber flow and be subject to fiber buildup, which would further restrict the flow of the stream, and might be damaged from continued exposure to the high temperature of the attenuating stream. For these reasons, second section 14 can pivot relative to the first section 12 in order that the second section 14 may be brought into general alignment with the attenuating stream. Stub axles 16 project laterally outwardly from semi-circular portions 18 of first section 12. Stub axle 16 fits in opening 22 formed in semi-circular side plates 19, 20 on second section 14. Side plates 19, 20 are recessed to receive the semi-circular portions 18 and the side walls 36 and 37 are similarly recessed adjacent portions 18 to receive the semi-circular portions of side plates 19, 20. The semi-circular portion 18 and the semi-circular side plates 19, 20 have the same radius of curvature and in their assembled position, define a complete circle, which facilitates pivotal movement of section 14 relative to section 12. As shown in FIG. 2, threaded actuator rod 24 passes through brackets 26 and 28 which are fixed to sections 12 and 14, respectively. Bracket 26 houses a nut member which threadingly engages rod 24. Bracket 28 has an internal stop. First and second washers (not shown) are welded to threaded rod 24 above and below the stop. Handle 30 may be grasped and rotated causing rod 24 to advance or retract through bracket 26. This effectively pushes or pulls bracket 28 causing section 14 to pivot about stub axles 16.

Upper and lower plates 32 and 34 are fixedly attached to side plates 19 and 20 by welding or other means of attachment (not shown). The first portion 12 has a front wall 36 affixed to side walls 37 and 38. The lower portion of wall 36 is curved forming a transition between the generally vertically extending first section 12 and the generally horizontally extending second section 14. The front edge 39 of this curved portion does not meet upper plate 32 but, rather, is positioned below the plane of the upper plate 32 and spaced laterally therefrom defining an opening 48. A closure or damper 50 extends across opening 48 and is pivotally attached to upper plate 32. Triangular segments 52 are attached to damper 50.

As can be seen in FIGS. 2 and 5, a second actuator rod 54 is attached to the triangular segment 52 on the opposite side of shroud 10 from actuator rod 24 by a pin 56 or other pivotal connection. The rod 54 passes through bracket 58 mounted on section 14. Bracket 58 guides rod 54 and retains it and damper 50 in the desired adjusted position by means of a friction bearing housed therein. In order to enable the operator to distinguish push-pull rod 54 from the threaded actuator rod 24, rod 54 and its handle 60 may be constructed of flat or rectangular stock.

Another opening 62 is formed below the centerline of the attenuating stream between the burner 40 and shroud 10. An extension of lower plate 34 is formed by strips 64 and 66. Lower plate 34 is hingedly connected to strip 64 which is, in turn, hingedly connected to strip 66. This double hinge connection enables the lower wall which is comprised of members 34, 64 and 66 to more closely approximate the curved surfaces of semi-circular portions 18 as section 14 is pivoted. As shown in FIG. 4, strip 66 has slots 68 by which bolts 70 slidably attach strip 66 to side walls 37 and 38 of stationary section 12. Strips 64 and 66 slide forward and backward to accommodate the pivoting of section 12, thereby increasing and reducing the size of opening 62.

Slots 72 are provided in side walls 37 and 38. These slots accommodate slide bearings 74 which rotatably support shaft 76 of pull roller 78. The front portion of bearings 74 and slots 72 are rounded to provide a snug forward position for the bearings in the slots. A portion of shaft 76 extends beyond one of the bearings 74 outside the confines of the shroud 10. This extension has a gear or other drivable means (not shown) mounted thereon to enable pull roller 78 to be driven. An upper groove 80 and a lower groove 82 in each side wall 37, 38, provide support for an upper and lower guide bars 84 and 86. These upper and lower guide bars are semi-cylindrical and threaded, the grooves of the threads engaging and guiding the primary filaments 88. A pin 90 positioned in each groove 82 limits the amount of forward movement of lower guide bar 86. The grooves 82 are tilted downward slightly which, in combination with the pressure from the filaments, prevents guide bar 86 from moving rearwardly. An intermediate set of grooves 92 support the ends of pressure bar 94. Grooves 92 have a more pronounced downward slant and cylindrical pressure bar 94 rides freely in grooves 92, keeping a forward pressure on primaries 88.

A support unit 96 for a second pull roller 79 is pivotally attached to side walls 37 and 38 by a pair of linkages 98. Each linkage 98 is double pinned to its respective wall 37, 38 and attached to roller support unit 96 by pivot pin 100. As with the first pull roller 78, the roller shaft 77 is supported in bearings 75 which slide in slots 73. As in the case with bearing slots 72, the outer dimensions of slots 73 are less than the heights of bearings 75, while the inner dimensions of the slots 73 can accommodate the height of the bearings 75. In this manner, the outer portions of the slots 73 maintain bearings 75 on shaft 77. An adjustment screw 102 is threaded into unit 96 and engages a spring strip (not shown) which, in turn, engages each slide bearing 75. Adjustment screw 102 controls the pressure the elastomeric rollers 78 and 79 exert on each other and on primaries 88.

Latch arms 104 are pivotally pinned to each side of roller support unit 96 at 105. Control bar 106 extends laterally between latch arms 104. Hooks 108 on arms 104 engage pins 110 on side walls 37 and 38. A single leaf spring 112 engages in a hole in the rear of control bar 106 and in another in the top of support unit 96 exerting a spring tension on latch arms 104. To unlatch support unit 96, the operator engages control bar 106, overcomes the spring pressure, and unhooks hooks 108 from pins 110 enabling unit 96 to pivot freely backward about pin 100. The operator now has the needed access to replace one or both of pull rollers 78 and 79.

A baffle plate 114 extends across the width of the attenuation shroud 10 between side walls 37 and 38. The high velocity stream emanating from orifice 46 will tend to inspirate dilution air, i.e., to draw air from the surrounding environment along with the stream eventually mixing therewith. Baffle plate 114 extends across a considerable portion of the rear of shroud 10 such that preference is given to the air in the immediate vicinity of the attenuating burner 40. The burner is exemplified by the types described and claimed in U.S. Pat. Nos. 3,212,557 and 3,547,568. The burner is comprised of a refractory material 115 such as high purity Kaolin clay encased in a refractory metal 116. The metallic surface above the burner 40 can reach a temperature of 800° F. (430° C.).

In order to maximize the use of this waste heat, a preheater 118 is mounted on top of burner 40. Preheater 118 consists of a top panel 120, two side panels 122, a plurality of ears 124 overlapping the sides of burner 40 by which the preheater 118 may be attached thereto by bolts 125 or the like, and on internal serpentine heat absorber 126 which increases the amount of heat transmitted to the preheater 118 from the burner 40 and subsequently transferred to the inspirated air.

Attenuation shroud 10 is fixedly positioned in front of burner orifice 46 by means of an L-shaped bracket 130 (FIG. 2). Bolts 134 pass through holes 132 in the bracket 130 and threadingly engage in support beam 126.

In operation, the shroud 10 is mounted as noted hereabove. Pull roller 78 is driven which in turn drives the other pull roller 79. The rate of rotation of pull rollers 78 and 79 determines the rate at which glass is drawn from the fiberizing bushing (not shown), which fixes the diameter of the filament primaries 88. Primaries 88 are guided by bars 84 and 86 downwardly to a point immediately adjacent the high temperature, high pressure, outlet orifice 46. Pressure bar 94 helps keep the filaments 88 in the grooves of bars 84 and 86. Should the filaments become entangled, the operator has complete access from the rear of the burner to engage the filaments with a tool and "comb" them back into separation.

Prior to engagement by the attenuating stream, primaries 88 are engaged by dilution air that has been heated by preheater 118 and which is drawn in by the high velocity of the attenuation stream. This dilution air provides a forward and downward force that helps maintain the primaries in proper alignment and begins the heating process. The filaments have cooled by the time they reach pull rollers 78 and 79 to about 200° F. (95° C.) and the inspirated dilution air which has been heated to a temperature of between 600°–700° F. (330°–390° C.) begins reheating the filaments.

If burner 40 is aligned so as to project its stream generally horizontally, inspirated air through opening 62 and the front of the shroud 10 form a boundary layer that supports the stream and reduces the likelihood of gravitational forces diverting the stream and fibers downwardly. Damper 50 can be opened to provide a flow of inspirated air from above the centerline of the attenuation stream. This air is of such quantity and direction as to create turbulence in the attenuation zone (the area surrounded by the shroud and extending downstream therefrom). This turbulence causes primaries 88 to adopt a serpentine path in the attenuation zone exposing a greater length of filament to a higher temperature for a longer period. This improves fiber attenuation and, in conjunction with the shroud, which makes the attenuation zone hotter, enables less fuel to be used to produce the same fiber diameter.

Should the attenuating burner 40 deviate from a horizontal direction (as will be apparent from fiber build-ups), the operator may tilt the second section 14 upwardly or downwardly by rotating handle 30 of actuator rod 24. Fine tuning of this adjustment can be made by closing or opening damper 50 by pushing or pulling handle 60 of actuator rod 54. This will adjust the amount of dilution air admitted through opening 48 to balance that entering through bottom opening 62 and bring the attenuation stream to a point where it is not directed toward the shroud.

The temperature of the attenuation stream heats the primaries to a level above the melting point of the glass and then the high pressure of the stream stretches the filaments. When the filaments cool below their melting point, the stream pressure breaks the filaments into fibers whose lengths fall in a predetermined range. This range of lengths is a function of the operational parameters and the configuration of the attenuation zone.

Various changes, modifications and alternatives will become apparent following a reading of the foregoing description. Accordingly, it is intended that all such changes, modifications and alternatives as fall within the scope of the appended claims be considered part of the present invention.

We claim:

1. An attenuation shroud in combination with a fiber attenuating burner, said burner having a degree of play in its mounting to accommodate positioning with respect to upstream elements, said play varying the alignment of said burner's outlet orifice, said attenuation shroud being characterized by a first upstream portion stationarily mounted adjacent said attenuating burner for receiving and directing a flow of hot gases from said outlet orifice, a second downstream portion hingedly mounted to said first portion for pivotal movement about a generally horizontal axis, control means to enable said second portion to be pivotally adjusted relative to said first portion to accommodate alignment variations of the attenuating burner's outlet orifice.

2. The combination of claim 1 characterized by a plurality of openings being provided to enable controlled amounts of dilution air to be inspirated from the region surrounding said attenuation shroud.

3. The combination of claim 2 characterized by a preheating element positioned to preheat at least some of the inspirated dilution air.

4. The combination of claim 3 characterized by said preheating element being mounted atop said attenuating burner, having an internal serpentine panel which increases the heat transferring surface area, and utilizing waste heat from said burner to preheat the dilution air.

5. The combination of claim 2 characterized in that at least one of said dilution air openings includes closure means to vary the size of said opening thereby adjusting the amount of dilution air flowing therethrough.

6. The combination of claim 2 characterized by a first one of said dilution air openings being positioned below the centerline of said outlet orifice and a second one of said openings being positioned above the centerline of said outlet orifice.

7. The combination of claim 6 characterized in that the size of said first opening varies as the position of said second shroud portion is adjusted.

8. The combination of claim 7 characterized by said second opening having closure means to vary the effective size of said opening responsive to changes in the size of said first opening in order that the inspirated air of said first and second openings can be used to modify the direction of the flow from said attenuating burner's outlet orifice.

9. The combination of claim 6 characterized by said second opening being asymmetrically positioned with respect to said first opening.

10. The combination of claim 1 characterized by said shroud including means to mount a pair of primary pull rolls and means to mount primary guide means.

* * * * *